(12) United States Patent
Williams et al.

(10) Patent No.: US 10,300,814 B2
(45) Date of Patent: May 28, 2019

(54) CHILD SAFETY SEAT (71) Applicant: Wonderland Switzerland AG, Steinhausen (CH)

(72) Inventors: Bruce Williams, Narvon, PA (US); Gregory Sellers, Christiana, PA (US)

(73) Assignee: Wonderland Switzerland AG, Steinhausen (CH)

( * ) Notice: Subject to any disclaimer, the term of this patent is extended or adjusted under 35 U.S.C. 154(b) by 71 days.

(21) Appl. No.: 15/705,273

(22) Filed: Sep. 15, 2017

(65) Prior Publication Data

US 2018/0079332 A1 Mar. 22, 2018

Related U.S. Application Data (60) Provisional application No. 62/395,706, filed on Sep. 16, 2016.

(51) Int. Cl.
*B60N 2/28* (2006.01)
*B60N 2/50* (2006.01)
*B60N 2/72* (2006.01)

(52) U.S. Cl.
CPC ......... *B60N 2/2824* (2013.01); *B60N 2/2812* (2013.01); *B60N 2/2845* (2013.01); *B60N 2/2851* (2013.01); *B60N 2/2863* (2013.01); *B60N 2/2881* (2013.01); *B60N 2/505* (2013.01); *B60N 2/72* (2013.01)

(58) Field of Classification Search
CPC .. B60N 2/2824; B60N 2/2812; B60N 2/2845; B60N 2/2851; B60N 2/2863; B60N 2/2881; B60N 2/505; B60N 2/72
See application file for complete search history.

(56) References Cited

U.S. PATENT DOCUMENTS

| | | | | |
|---|---|---|---|---|
| 5,522,639 A | * | 6/1996 | Jaime | B60N 2/28 297/183.3 |
| 6,152,528 A | | 11/2000 | van Montfort | |
| 6,517,153 B1 | * | 2/2003 | Brewer | A47C 7/66 297/184.1 |
| 6,672,664 B2 | | 1/2004 | Yanaka | |
| 6,783,135 B1 | * | 8/2004 | Nord | B60N 2/2806 280/30 |
| 6,979,057 B2 | * | 12/2005 | Sedlack | A47D 13/02 297/250.1 |
| 7,163,265 B2 | | 1/2007 | Adachi | |
| 7,438,358 B2 | * | 10/2008 | Jane Santamaria | A47D 13/02 297/256.1 |
| 7,472,955 B2 | | 1/2009 | Crane | |
| 7,926,874 B2 | | 4/2011 | Hendry | |

(Continued)

*Primary Examiner* — Philip F Gabler
(74) *Attorney, Agent, or Firm* — Winston Hsu (57) ABSTRACT A child safety seat includes a seat body, a headrest, a headrest adjusting mechanism, and a harness component. A seat space is defined on the seat body. The headrest is movably disposed on a front side of the seat body facing the seat space. The headrest adjusting mechanism is for allowing the headrest to move relative to the seat body or restraining the headrest from moving relative to the seat body. The harness component includes a first part and a second part. The first part at least partially is received between the headrest adjusting mechanism and the seat body. The second part is connected to the first part and exposed out of the headrest toward the seat space.

20 Claims, 11 Drawing Sheets (56) References Cited

U.S. PATENT DOCUMENTS

| | | |
|---|---|---|
| 7,988,230 B2 | 8/2011 | Heisey |
| 8,262,161 B2 | 9/2012 | Fritz |
| 8,322,788 B2 | 12/2012 | Williams |
| 8,567,862 B2 | 10/2013 | Williams |
| 8,573,695 B2 | 11/2013 | Van Geer |
| 8,845,022 B2 | 9/2014 | Strong |
| 8,870,285 B2 | 10/2014 | Williams |
| 8,979,198 B2 * | 3/2015 | Williams .............. B60N 2/2806 297/250.1 |
| 9,156,379 B2 | 10/2015 | Williams |
| 9,162,593 B2 * | 10/2015 | Spence .................. B60N 2/265 |
| 9,315,124 B2 | 4/2016 | Lehman |
| 9,365,135 B2 | 6/2016 | Carpenter |
| 9,499,074 B2 | 11/2016 | Strong |
| 9,598,025 B1 * | 3/2017 | Scheppegrell ........... B60N 2/90 |
| 9,937,823 B2 | 4/2018 | Williams |
| 9,963,051 B2 | 5/2018 | Strong |
| 2003/0164632 A1 | 9/2003 | Sedlack |
| 2005/0110318 A1 | 5/2005 | Meeker |
| 2005/0168023 A1 * | 8/2005 | Gangadharan ......... A47D 13/02 297/250.1 |
| 2011/0254331 A1 * | 10/2011 | Nagelski .............. B60N 2/2806 297/216.11 |
| 2014/0265480 A1 * | 9/2014 | Perrin ...................... B60N 2/26 297/217.4 |
| 2017/0240072 A1 * | 8/2017 | Wright ................. B60N 2/2848 |

* cited by examiner

CHILD SAFETY SEAT

CROSS REFERENCE TO RELATED APPLICATIONS

This application claims the benefit of U.S. Provisional Patent Application No. 62/395,706 filed on Sep. 16, 2016, which is hereby incorporated by reference in its entirety.

BACKGROUND OF THE INVENTION

1. Field of the Invention

The present invention relates to a child safety seat, and more particularly, to a child safety seat having a clean appearance and capable of preventing a harness component from knotting and providing comfortable carry experience.

2. Description of the Prior Art

A child safety seat is specifically designed to protect children from injury or death during collisions. However, a conventional child safety seat usually has following drawbacks. Firstly, a harness component of the child safety seat usually hangs behind a seat body of the child safety seat when it is not in use. Therefore, the harness component may get knotted easily, which causes a potential safety issue. Secondly, a canopy of the child safety seat usually falls behind the seat body when it is not in use, which results in untidy appearance. At least, a carrying member of the child safety seat is usually rigid and made of plastic or metal material, which brings uncomfortable carrying experience for caregivers.

SUMMARY OF THE INVENTION

Therefore, an objective of the present invention is to provide a child safety seat having a clean appearance and capable of preventing a harness component from knotting and providing comfortable carry experience for solving the aforementioned problems.

In order to achieve the aforementioned objective, the present invention discloses a child safety seat includes a seat body, a headrest, a headrest adjusting mechanism, and a harness component. A seat space is defined on the seat body. The headrest is movably disposed on a front side of the seat body facing the seat space. The headrest adjusting mechanism is for allowing the headrest to move relative to the seat body or restraining the headrest from moving relative to the seat body. The harness component includes a first part and a second part. The first part is at least partially received between the headrest adjusting mechanism and the seat body. The second part is connected to the first part and exposed out of the headrest toward the seat space.

According to an embodiment of the present invention, the headrest adjusting mechanism includes at least one first engaging component and at least one second engaging component. The at least one first engaging component is slidably disposed on the headrest and partially exposed out of a front side of the headrest facing the seat space. The at least one second engaging component is disposed inside the seat body. The headrest is restrained from moving relative to the seat body when the at least one first engaging component slides to engage with the at least one second engaging component, and the headrest is allowed to move relative to the seat body when the at least one first engaging component slides to disengage from the at least one second engaging component.

According to an embodiment of the present invention, the at least one first engaging component includes an operating portion and an engaging portion. The operating portion is exposed out of the front side of the headrest. The engaging portion is connected to the operating portion and disposed on a rear side of the headrest adjacent to the seat body. The operating portion drives the engaging portion to engage with or disengage from the at least one second engaging component.

According to an embodiment of the present invention, the seat body includes a rear shell. The at least one second engaging component is disposed near a side of the seat body adjacent to the headrest and hidden by the rear shell.

According to an embodiment of the present invention, the operating portion is a strap connected to the engaging portion, and the engaging portion is driven to disengage from the at least one second engaging component by pulling the strap outwardly.

According to an embodiment of the present invention, the headrest adjusting mechanism further includes a recovering component abutting against the at least one first engaging component for driving the engaging portion to engage with the at least one second engaging component when the strap is released.

According to an embodiment of the present invention, the seat body includes a rear shell. The at least one first engaging component is a latch. The at least one second engaging component is a positional rack, and the positional rack is disposed near a side of the seat body adjacent to the headrest and hidden by the rear shell.

According to an embodiment of the present invention, the headrest adjusting mechanism further includes a recovering component abutting against the at least one first engaging component for biasing the engaging portion to engage with the at least one second engaging component.

According to an embodiment of the present invention, the headrest adjusting mechanism includes a lower panel assembly connected to the headrest, and an accommodating space is formed between the lower panel assembly and the seat body for receiving the first part of the harness component.

According to an embodiment of the present invention, the harness component further includes a third part connected to the first part and exposed out of the lower panel assembly to be fixed on a bottom portion of the seat body.

According to an embodiment of the present invention, the headrest adjusting mechanism includes at least one side wing disposed on at least one side of the headrest.

According to an embodiment of the present invention, the child safety seat further includes a canopy assembly disposed on the seat body, and the canopy assembly includes a cloth body, at least one mounting module, a rear frame, and a front frame. The at least one mounting module is detachably disposed on the seat body. The rear frame is installed on the seat body for fixing a side portion of the cloth body onto the seat body. The front frame is installed on the at least one mounting module and foldable relative to the rear frame. Another side portion of the cloth body is attached onto the front frame.

According to an embodiment of the present invention, the canopy assembly further includes a middle frame disposed between the front frame and the rear frame for supporting a middle portion of the cloth body between the side portion and the another side portion of the cloth body.

According to an embodiment of the present invention, the canopy assembly further includes a pocket component disposed on the seat body for at least partially receiving the cloth body and the front frame.

According to an embodiment of the present invention, the canopy assembly further includes a visor, and the another side of the cloth body is disposed on the front frame by the visor.

According to an embodiment of the present invention, the seat body includes a sliding track, and the at least one mounting module includes a connecting portion and a rotary portion. The connecting portion is slidably installed on the sliding track. The rotary portion is rotatably combined with the connecting portion. The front frame is installed on the rotary portion.

According to an embodiment of the present invention, a protrusion is formed on the sliding track. A recess is formed on the connecting portion, and the connecting portion and the sliding track are engaged with each other by engagement of the protrusion and the recess.

According to an embodiment of the present invention, the at least one mounting module includes a first gear disposed on the connecting portion and a second gear disposed on the rotary portion and cooperating with the first gear for adjusting an angle of the rotary portion relative to the connecting portion.

According to an embodiment of the present invention, the child safety seat further includes a handle pivoted to the seat body and at least one absorbing component disposed on the handle.

According to an embodiment of the present invention, the at least one absorbing component includes a clamping base and a pad component. The clamping base clamps the handle, and the pad component is disposed on a side of the clamping base away from the handle and made of soft material.

According to an embodiment of the present invention, the handle includes a clamping track. The at least one absorbing component includes a clamping base and a pad component. The clamping base is slidably installed along the clamping track, and the pad component is disposed on a side of the clamping base away from the handle and made of soft material.

In summary, the present invention utilizes the headrest adjusting mechanism for adjusting the position of the headrest and receiving the harness component in the accommodating space between the seat body and lower panel assembly. Therefore, it is not necessary to form a hole on the rear shell for the harness component to pass through, and the harness component is prevented from hanging behind the seat body, which not only improves an aesthetic appearance but also reduces a possibility of knotting of the harness component. Furthermore, the present invention utilizes the pocket component for at least partially receiving the cloth body and the front frame when the canopy assembly is folded. Therefore, the child safety seat has clean and tidy appearance. Besides, the present invention utilizes the absorbing component disposed on the handle for providing caregivers with comfortable carrying experience.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
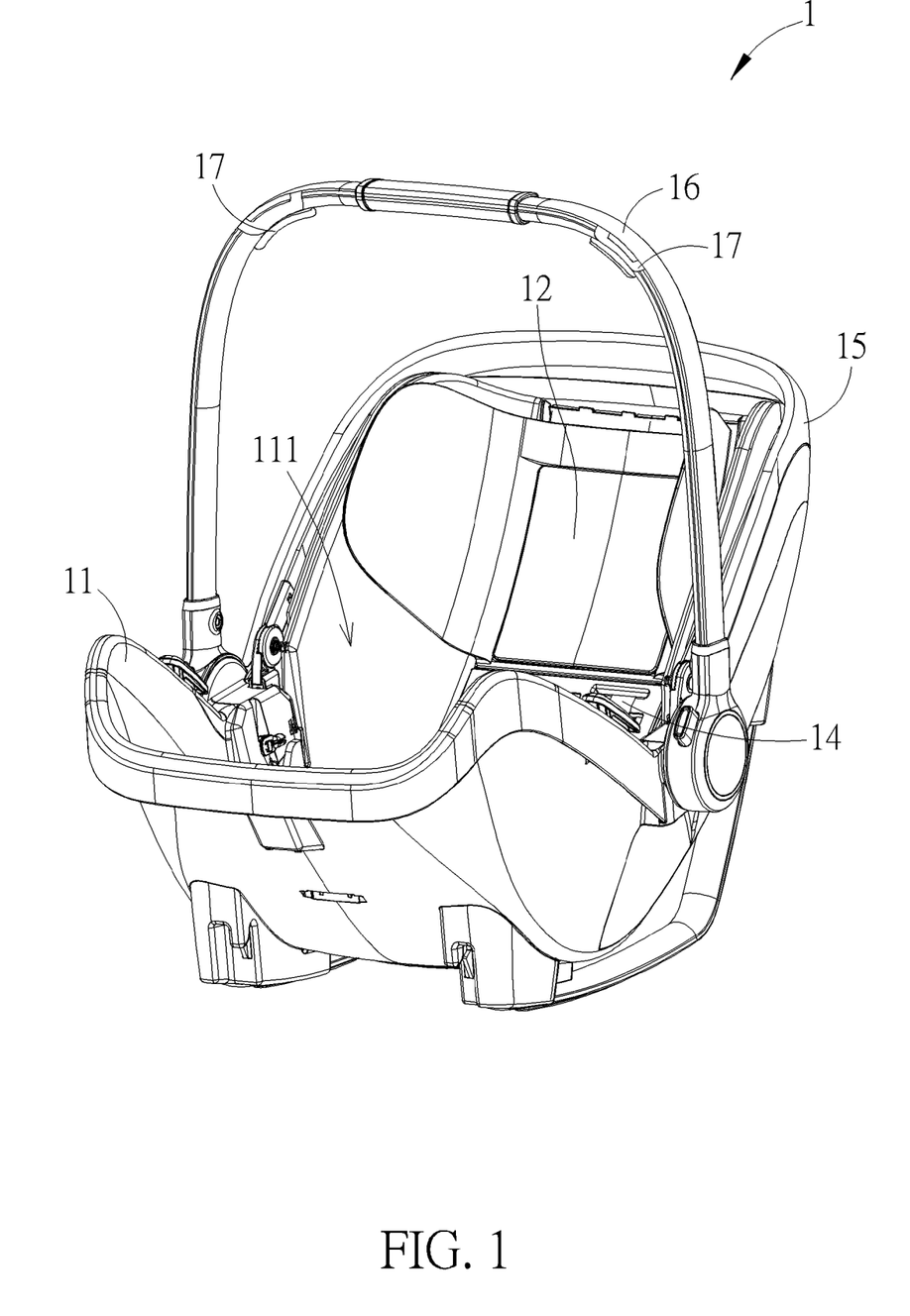
FIG. 1 is a schematic diagram of a child safety seat according to an embodiment of the present invention.
Figure 2:
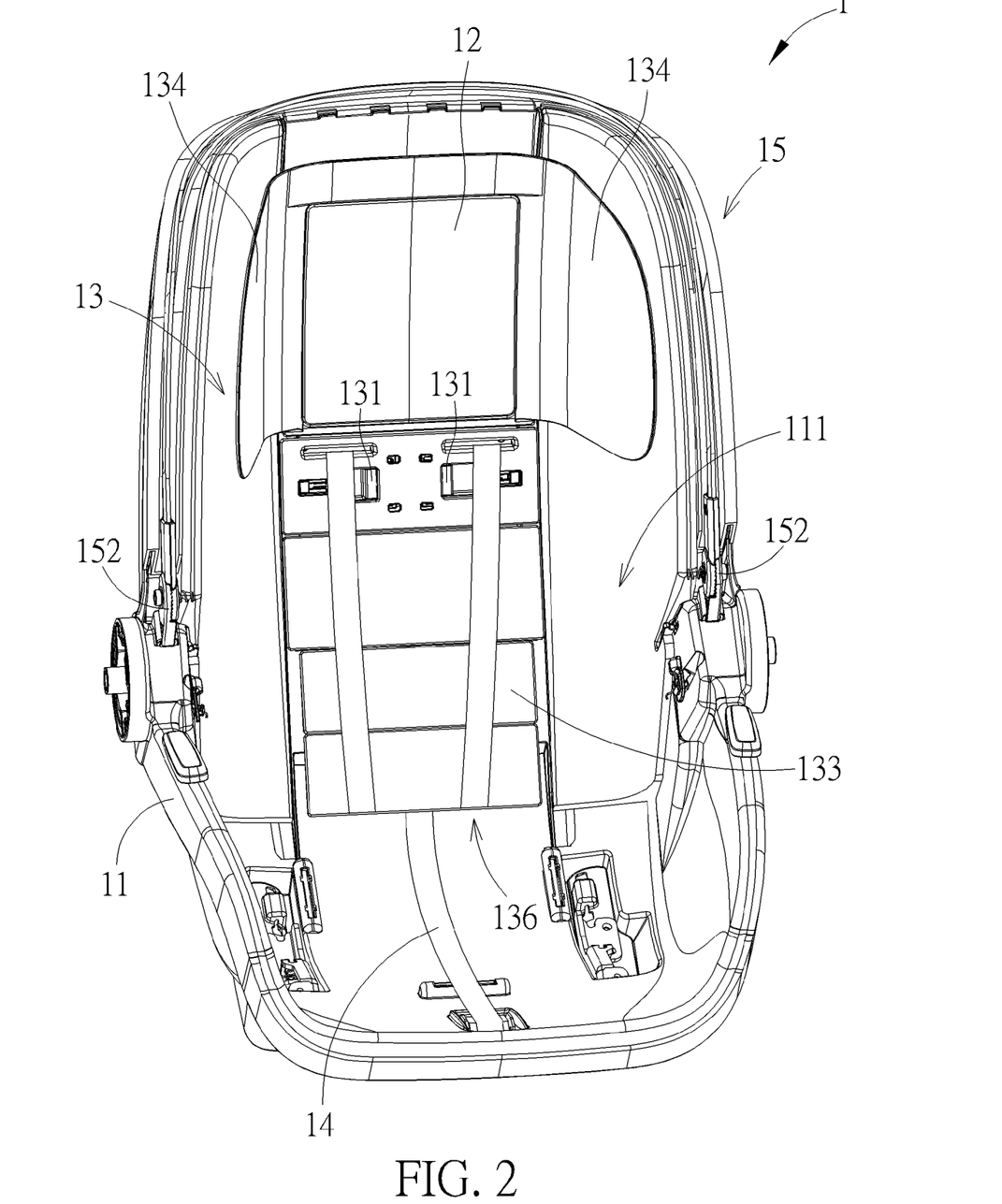
FIG. 2 is a partial diagram of the child safety seat according to the embodiment of the present invention.

Please refer to FIG. 1 and FIG. 2. FIG. 1 is a schematic diagram of a child safety seat 1 according to an embodiment of the present invention. FIG. 2 is a partial diagram of the child safety seat 1 according to the embodiment of the present invention. As shown in FIG. 1 and FIG. 2, the child safety seat 1 includes a seat body 11, a headrest 12, a headrest adjusting mechanism 13, a harness component 14, a canopy assembly 15, a handle 16, and two absorbing components 17. A seat space 111 is defined on the seat body 11 for accommodating a child. The headrest 12 is movably disposed on a front side of the seat body 11 facing the seat space 111 for providing support of a head and a neck of the child. The headrest adjusting mechanism 13 allows the headrest 12 to move relative to the seat body 11 or restrains the headrest 12 from moving relative to the seat body 11, which provides comfort and safety. The harness component 14 is partially disposed between the headrest adjusting mechanism 13 and the seat body 11 and partially exposed out of the headrest 12 for fastening the child sitting in the seat space 111. The canopy assembly 15 is disposed on the seat body 11 for providing a shield from sunlight, wind, or rain. The handle 16 is disposed on the seat body 11, and the two absorbing components 17 are disposed on the handle 16 for providing comfortable carrying experience.

Figure 3:
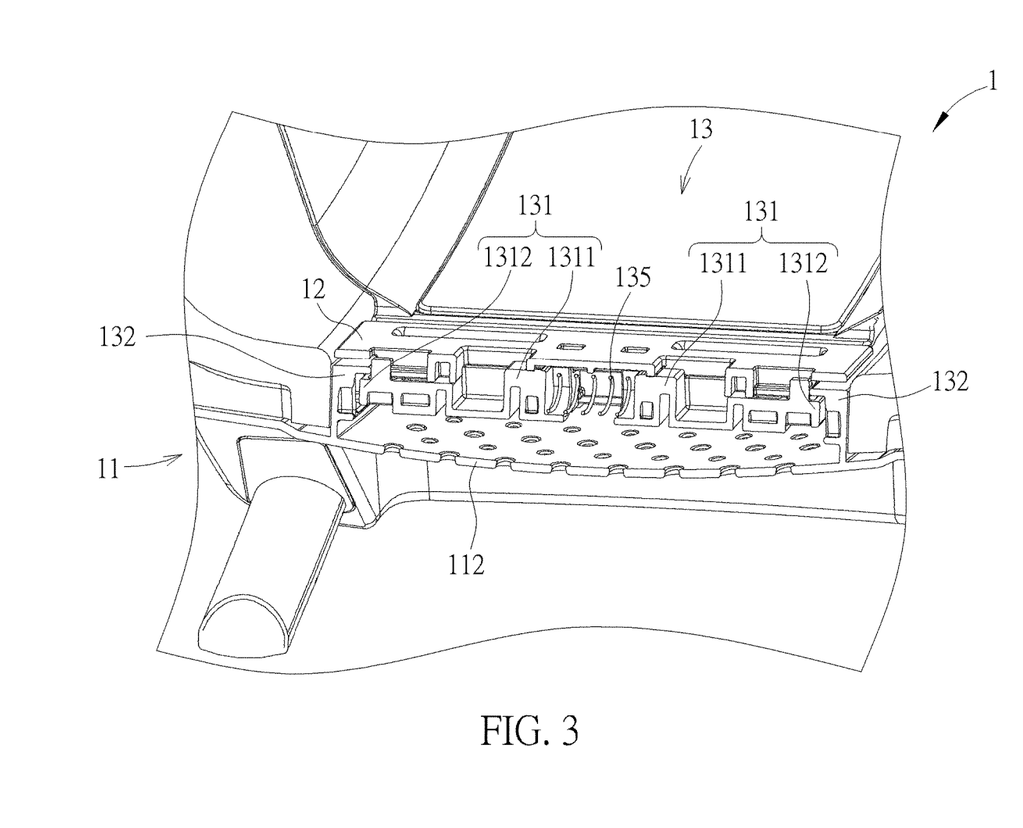
FIG. 3 is a partial sectional diagram of the child safety seat according to the embodiment of the present invention.

Please refer to FIG. 2 and FIG. 3. FIG. 3 is a partial sectional diagram of the child safety seat 1 according to the embodiment of the present invention. As shown in FIG. 2 and FIG. 3, the headrest adjusting mechanism 13 includes two first engaging components 131, two second engaging components 132, a lower panel assembly 133, two side wings 134, and a recovering component 135. The two side wings 134 are disposed on two opposite sides of the headrest 12 for providing lateral protection of the head of the child. The lower panel assembly 133 is connected to a lower side of the headrest 12, and an accommodating space 136 is formed between the lower panel assembly 133 and the seat body 11 for partially receiving the harness component 14. The two first engaging components 131 are slidably disposed on the headrest 12 and partially exposed out of a front side of the headrest 12 facing the seat space 111. Each of the two first engaging components 131 includes an operating portion 1311 and an engaging portion 1312. The operating portion 1311 is exposed out of the front side of the headrest 12. The engaging portion 1312 is connected to the operating portion 1311 and disposed on a rear side of the headrest 12 adjacent to the seat body 11. The two second engaging components 132 are disposed inside the seat body 11 and located near a side of the seat body 11 adjacent to the headrest 12 and hidden by a rear shell 112 of the seat body 11. The recovering component 135 abuts between the two first engaging components 131 for biasing the two first engaging components 131 to engage the two engaging portions 1312 with the two second engaging components 132. In this embodiment, the first engaging component 131 can preferably be a latch, and the second engaging component 132 can preferably be a positional rack. However, it is not limited thereto.

When it is desired to adjust a position of the headrest 12 relative to the seat body 11, the two operation portions 1311 can be operated to slide toward each other to drive the two engaging portions 1312 to disengage from the two second engaging components 132 respectively, so that the headrest 12 is allowed to move relative to the seat body 11. At this moment, the recovering component 135 is compressed. Afterwards, the two operation portions 1311 can be released, so that the compressed recovering component 135 is decompressed to drive the two first engaging components 131 to engage the two engaging portions 1312 with the two second engaging components 132. Therefore, the headrest 12 is restrained from moving relative to the seat body 11 again.

Figure 4:
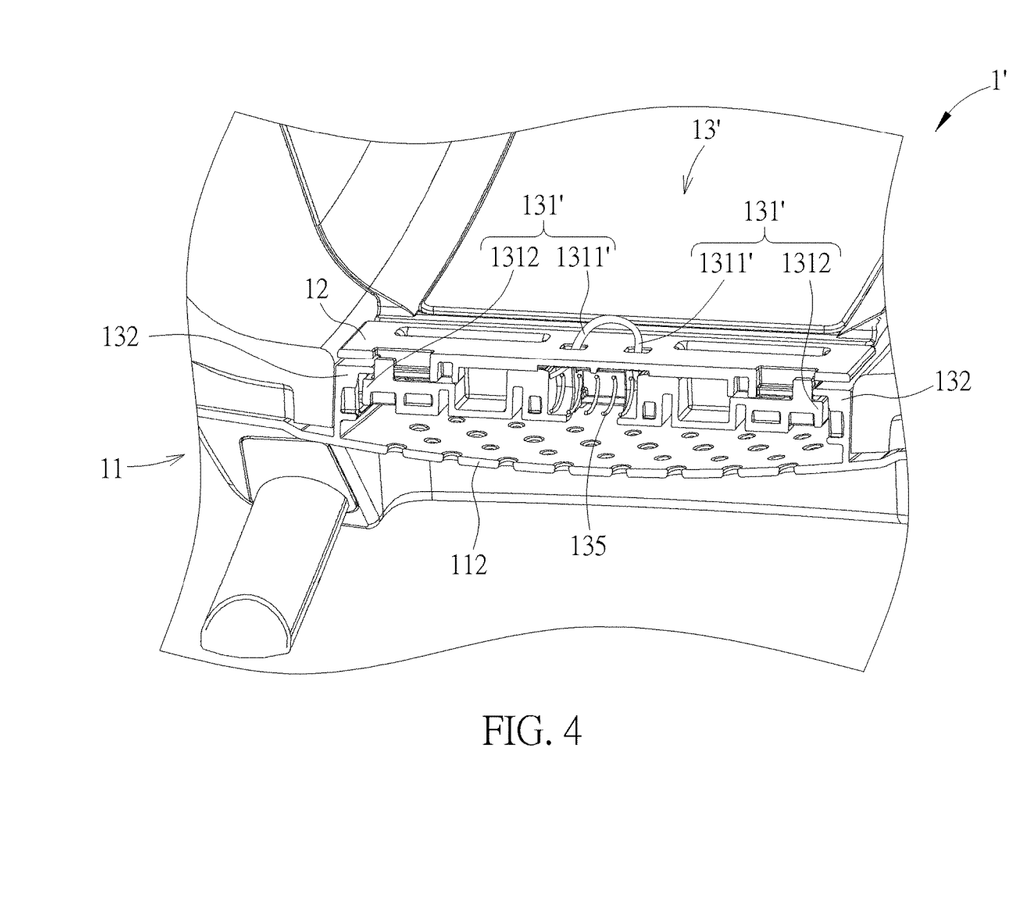
FIG. 4 is a partial sectional diagram of a child safety seat according to another embodiment of the present invention.

However, structure of the headrest adjusting mechanism 13 of the present invention is not limited to this embodiment. Please refer to FIG. 4. FIG. 4 is a partial sectional diagram of a child safety seat 1' according to another embodiment of the present invention. As shown in FIG. 4, in this embodiment, two operating portions 1311' of two first engaging components 131' of a headrest adjusting mechanism 13' can be connected to each other to form a strap. Two ends of the strap are connected to the two engaging portions 1312 respectively, and a middle portion of the strap is exposed out of the headrest 12. In such a way, when it is desired to adjust the position of the headrest 12 relative to the seat body 11, the two engaging portions 1312 can be driven to disengage from the two second engaging components 132 by pulling the strap outwardly, so that the headrest 12 is allowed to move relative to the seat body 11. After the strap is released, the compressed recovering component 135 is decompressed to drive the two first engaging components 131 to engage the two engaging portions 1312 with the two second engaging components 132.

Figure 5:
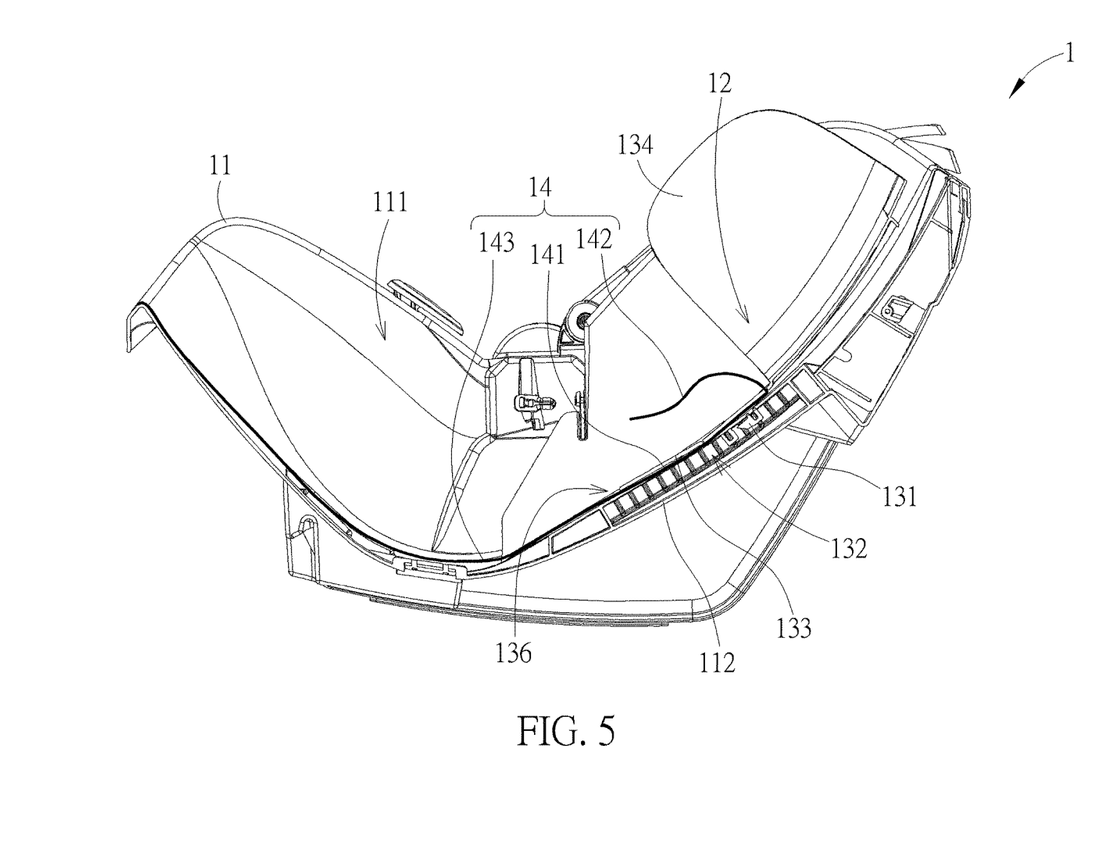
FIG. 5 is a partial internal structural diagram of the child safety seat according to the embodiment of the present invention.

Please refer to FIG. 5. FIG. 5 is a partial internal structural diagram of the child safety seat 1 according to the embodiment of the present invention. The harness component 14 includes a first part 141, a second part 142, and a third part 143. The first part 141 is at least partially received in the accommodating space 136 between the lower panel assembly 133 of the headrest adjusting mechanism 13 and the seat body 11. The second part 142 is connected to an end of the first part 141 and exposed out of the headrest 12 toward the seat space 111. The third part 143 is connected to another end of the first part 141 and exposed out of the lower panel assembly 133 to be fixed on a bottom portion of the seat body 11. Therefore, it is not necessary to form a hole on the rear shell 112 for allowing the harness component to pass through, which improves an aesthetic appearance. Furthermore, the harness component 14 is prevented from hanging behind the seat body 11, which reduces a possibility of knotting of the harness component 14 and enhances safety.

Figure 6:
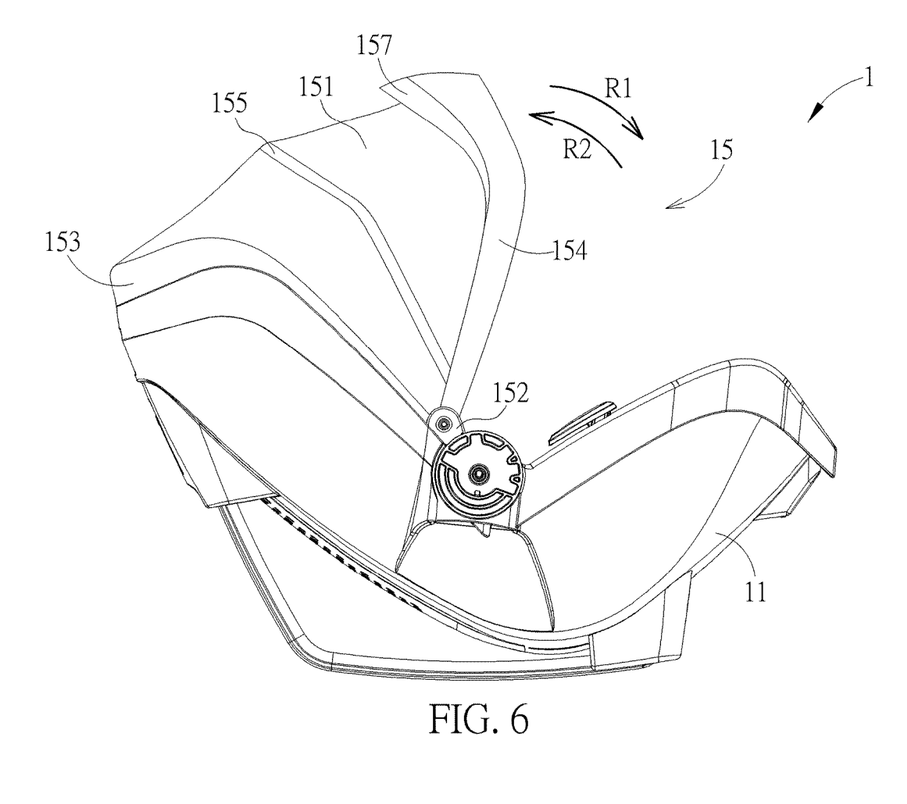
FIG. 6 and FIG. 7 are lateral diagrams of the child safety seat as a canopy assembly is indifferent states according to the embodiment of the present invention.
Figure 7:
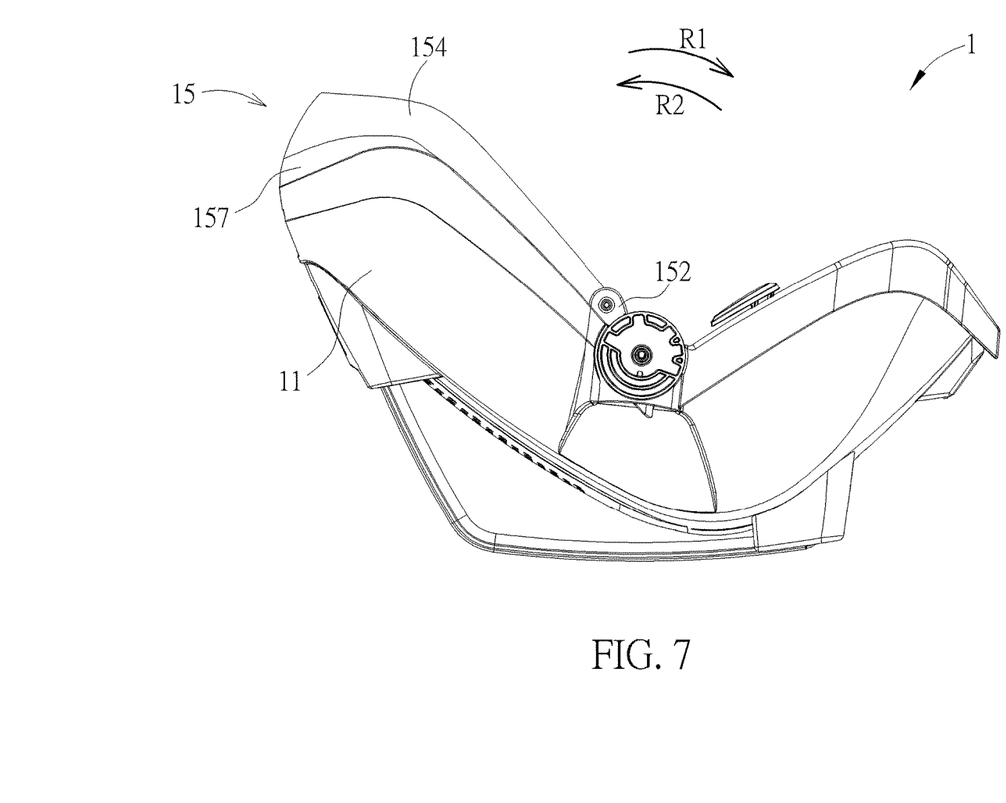
Figure 8:
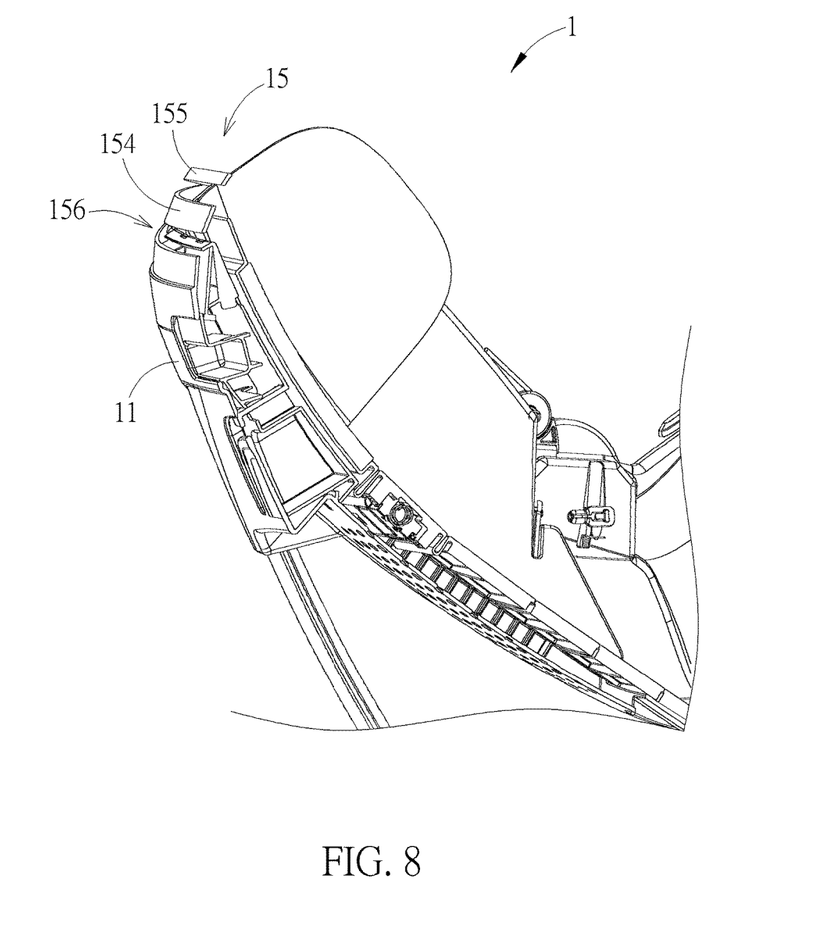
FIG. 8 is another partial internal structural diagram of the child safety seat according to the embodiment of the present invention.

Please refer to FIG. 2 and FIG. 6 to FIG. 8. FIG. 6 and FIG. 7 are lateral diagrams of the child safety seat 1 as the canopy assembly 15 is in different states according to the embodiment of the present invention. FIG. 8 is another partial internal structural diagram of the child safety seat 1 according to the embodiment of the present invention. As shown in FIG. 2 and FIG. 6 to FIG. 8, the canopy assembly 15 includes a cloth body 151, two mounting modules 152, a rear frame 153, a front frame 154, a middle frame 155, a pocket component 156, and a visor 157. The two mounting modules 152 are detachably disposed on the seat body 11. The rear frame 153 is installed on the seat body 11. The front frame 154 is installed on the two mounting modules 152 and foldable relative to the rear frame 15. A side portion of the cloth body 151 is fixed onto the seat body 11 by the rear frame 153, and another side portion of the cloth body 151 is attached onto the front frame 154 by the visor 157. The middle frame 155 is disposed between the front frame 154 and the rear frame 153 for supporting a middle portion of the cloth body 151 between the side portion and the another side portion of the cloth body 151. As shown in FIG. 7 and FIG. 8, the pocket component 156 is disposed on an edge of the seat body 11 for at least partially receiving the cloth body 151, the middle frame 155, and the front frame 154 when the canopy assembly 15 is in a folded state.

Figure 9:
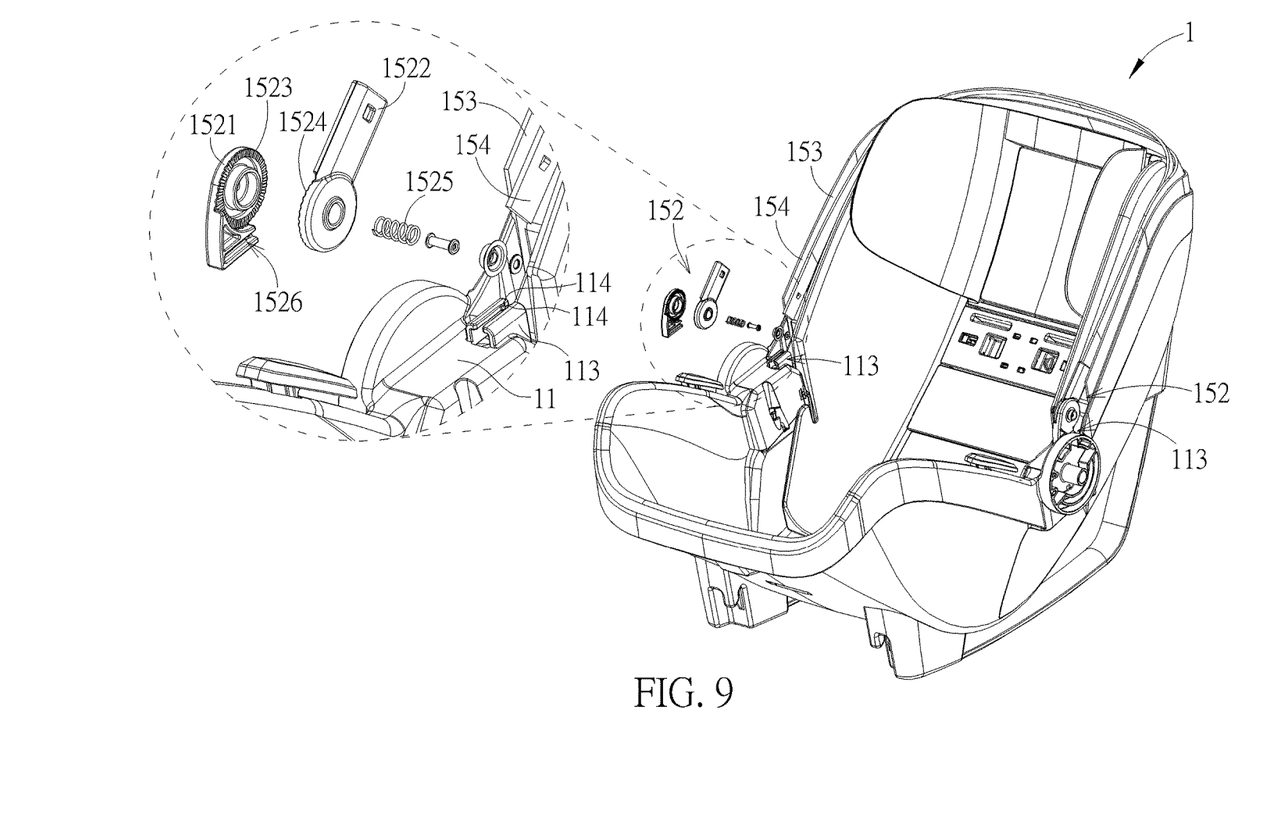
FIG. 9 is a partial exploded diagram of the child safety seat according to the embodiment of the present invention.

Please refer to FIG. 9. FIG. 9 is a partial exploded diagram of the child safety seat 1 according to the embodiment of the present invention. As shown in FIG. 9, in this embodiment, the seat body 11 further includes two sliding tracks 113. Each of the two mounting modules 152 includes a connecting portion 1521, a rotary portion 1522, a first gear 1523, a second gear 1524, and a resilient component 1525. The connecting portion 1521 is slidably installed on the sliding track 113. Two protrusions 114 are formed on the sliding track 113. Two recesses 1526 are formed on the connecting portion 1521. By engagement of the two protrusions 114 and the two recesses 1526, the connecting portion 1521 and the sliding track 113 can be engaged with each other. The front frame 154 is installed on the rotary portion 1522. The first gear 1523 is disposed on the connecting portion 1521. The second gear 1524 is disposed on the rotary portion 1521. The rotary portion 1522 and the connecting portion 1522 are rotatably combined with each other by the first gear 1523 and the second gear 1524. The resilient component 1525 is for biasing the rotary portion 1522 to engage with the connecting portion 1521 for fixing an angle of the rotary portion 1522 relative to the connecting portion 1521.

As shown in FIG. 6, FIG. 7, and FIG. 9, when it is desired to unfold the canopy assembly 15 to an unfolded state, as shown in FIG. 6, to provide protection the shield from sunlight, wind, or rain, the front frame 154 can be operated to drive the rotary portion 1522 to rotate relative to the connecting portion 1521 along a first rotating direction R1 by cooperation of the first gear 1523 and the second gear 1524. On the other hand, when it is desired to fold the canopy assembly 15 to the folded state, as shown in FIG. 7, the front frame 154 can be operated to drive the rotary portion 1522 to rotate relative to the connecting portion 1521 along a second rotating direction R2 opposite to the first rotating direction R1 by cooperation of the first gear 1523 and the second gear 1524 until the cloth body 151, the middle frame 155, and the front frame 154 are partially received in the pocket component 156, which provides clean and tidy appearance when the canopy assembly 15 is folded.

Figure 10:
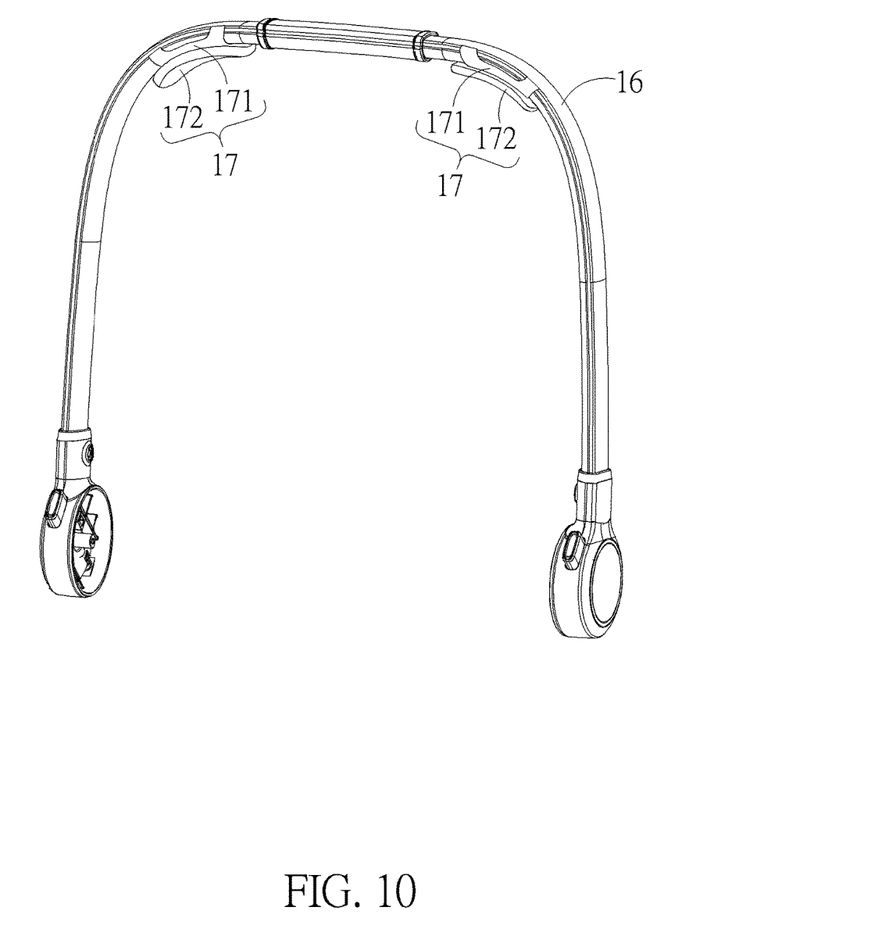
FIG. 10 is a diagram of a handle and two absorbing components according to the embodiment of the present invention.

Please refer to FIG. 1 and FIG. 10. FIG. 10 is a diagram of the handle 16 and the two absorbing components 17 according to the embodiment of the present invention. As shown in FIG. 1 and FIG. 10, the handle 16 is pivoted to the seat body 11. In this embodiment, the two absorbing components 17 can be preferably disposed at two corners of the handle 16. Each of the two absorbing components 17 includes a clamping base 171 and a pad component 172. The clamping base 171 clamps the handle 16. The pad component 172 is disposed on a side of the clamping base 171 away from the handle 16. Since the pad component 172 is made of soft material, such as fabric, foam or rubber, it can provide caregivers with comfortable carrying experience when carrying the child safety seat 1.

Figure 11:
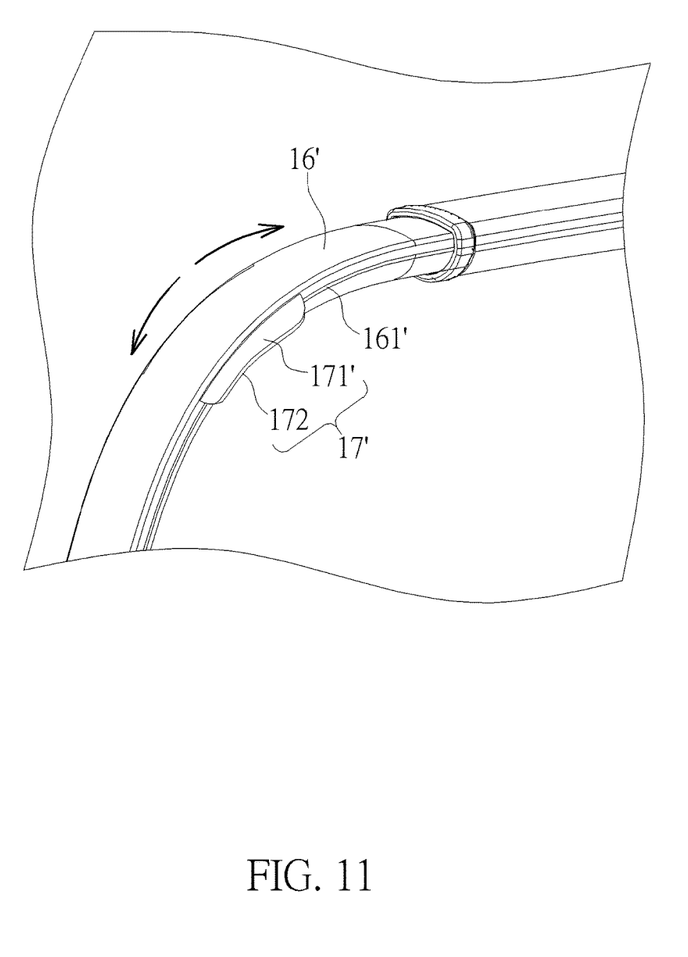
FIG. 11 is a diagram of a handle and an absorbing component according to another embodiment of the present invention.

However, structures of the handle 16 and the absorbing component 17 are not limited to this embodiment. Please refer to FIG. 11. FIG. 11 is a partial diagram of a handle 16' and an absorbing component 17' according to another embodiment of the present invention. As shown in FIG. 11, in this embodiment, the handle 16' includes a clamping track 161', and a clamping base 171' of the absorbing component 17' is slidably installed along the clamping track 161'. Therefore, it allows users to adjust positions of the two absorbing components 17' along the clamping track 161' easily.

In contrast to the prior art, the present invention utilizes the headrest adjusting mechanism for adjusting the position of the headrest and receiving the harness component in the accommodating space between the seat body and lower panel assembly. Therefore, it is not necessary to form a hole on the rear shell for the harness component to pass through, and the harness component is prevented from hanging behind the seat body, which not only improves anaesthetic appearance but also reduces a possibility of knotting of the harness component. Furthermore, the present invention utilizes the pocket component for at least partially receiving the cloth body and the front frame when the canopy assembly is folded. Therefore, the child safety seat has clean and tidy appearance. Besides, the present invention utilizes the absorbing component disposed on the handle for providing caregivers with comfortable carrying experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
   a seat body whereon a seat space is defined;
   a headrest movably disposed on a front side of the seat body facing the seat space;
   a headrest adjusting mechanism for allowing the headrest to move relative to the seat body or restraining the headrest from moving relative to the seat body, the headrest adjusting mechanism comprising:
   at least one first engaging component slidably disposed on the headrest and partially exposed out of a front side of the headrest facing the seat space; and
   at least one second engaging component disposed inside the seat body; and
   a harness component comprising:
   a first part at least partially received between the headrest adjusting mechanism and the seat body; and
   a second part connected to the first part and exposed out of the headrest toward the seat space;
   wherein the headrest is restrained from moving relative to the seat body when the at least one first engaging component slides to engage with the at least one second engaging component, and the headrest is allowed to move relative to the seat body when the at least one first engaging component slides to disengage from the at least one second engaging component.

2. The child safety seat of claim 1, wherein the at least one first engaging component comprises:
   an operating portion exposed out of the front side of the headrest; and
   an engaging portion connected to the operating portion and disposed on a rear side of the headrest adjacent to the seat body, the operating portion driving the engaging portion to engage with or disengage from the at least one second engaging component.

3. The child safety seat of claim 2, wherein the seat body comprises a rear shell, the at least one second engaging component is disposed near a side of the seat body adjacent to the headrest and hidden by the rear shell.

4. The child safety seat of claim 2, wherein the operating portion is a strap connected to the engaging portion, and the engaging portion is driven to disengage from the at least one second engaging component by pulling the strap outwardly.

5. The child safety seat of claim 4, wherein the headrest adjusting mechanism further comprises a recovering component abutting against the at least one first engaging component for driving the engaging portion to engage with the at least one second engaging component when the strap is released.

6. The child safety seat of claim 2, wherein the seat body comprises a rear shell, the at least one first engaging component is a latch, the at least one second engaging component is a positional rack, and the positional rack is disposed near a side of the seat body adjacent to the headrest and hidden by the rear shell.

7. The child safety seat of claim 6, wherein the headrest adjusting mechanism further comprises a recovering component abutting against the at least one first engaging component for biasing the engaging portion to engage with the at least one second engaging component.

8. The child safety seat of claim 1, wherein the headrest adjusting mechanism comprises a lower panel assembly connected to the headrest, and an accommodating space is formed between the lower panel assembly and the seat body for receiving the first part of the harness component.

9. The child safety seat of claim 8, wherein the harness component further comprises a third part connected to the first part and exposed out of the lower panel assembly to be fixed on a bottom portion of the seat body.

10. The child safety seat of claim 1, wherein the headrest adjusting mechanism comprises at least one side wing disposed on at least one side of the headrest.

11. The child safety seat of claim 1, further comprising a canopy assembly disposed on the seat body, and the canopy assembly comprising:
   a cloth body;

at least one mounting module detachably disposed on the seat body;

a rear frame installed on seat body for fixing a side portion of the cloth body onto the seat body; and a front frame installed on the at least one mounting module and foldable relative to the rear frame, another side portion of the cloth body being attached onto the front frame.

12. The child safety seat of claim 11, wherein the canopy assembly further comprises a middle frame disposed between the front frame and the rear frame for supporting a middle portion of the cloth body between the side portion and the another side portion of the cloth body.

13. The child safety seat of claim 11, wherein the canopy assembly further comprises a pocket component disposed on the seat body for at least partially receiving the cloth body and the front frame.

14. The child safety seat of claim 11, wherein the canopy assembly further comprises a visor, and the another side of the cloth body is disposed on the front frame by the visor.

15. The child safety seat of claim 11, wherein the seat body comprises a sliding track, and the at least one mounting module comprises:

a connecting portion slidably installed on the sliding track; and a rotary portion rotatably combined with the connecting portion, the front frame being installed on the rotary portion.

16. The child safety seat of claim 15, wherein a protrusion is formed on the sliding track, a recess is formed on the connecting portion, and the connecting portion and the sliding track are engaged with each other by engagement of the protrusion and the recess.

17. The child safety seat of claim 15, wherein the at least one mounting module comprises a first gear disposed on the connecting portion and a second gear disposed on the rotary portion and cooperating with the first gear for adjusting an angle of the rotary portion relative to the connecting portion.

18. The child safety seat of claim 1, further comprising a handle pivoted to the seat body and at least one absorbing component disposed on the handle.

19. The child safety seat of claim 18, wherein the at least one absorbing component comprises a clamping base and a pad component, the clamping base clamps the handle, and the pad component is disposed on a side of the clamping base away from the handle and made of soft material.

20. The child safety seat of claim 18, wherein the handle comprises a clamping track, the at least one absorbing component comprises a clamping base and a pad component, the clamping base is slidably installed along the clamping track, and the pad component is disposed on a side of the clamping base away from the handle and made of soft material.

* * * * *